United States Patent
Wada et al.

(10) Patent No.: US 7,697,216 B2
(45) Date of Patent: Apr. 13, 2010

(54) LENS DRIVE DEVICE

(75) Inventors: Akihito Wada, Nagano (JP); Tsuneo Sato, Nagano (JP)

(73) Assignee: Nidec Sankyo Corporation (JP)

( * ) Notice: Subject to any disclaimer, the term of this patent is extended or adjusted under 35 U.S.C. 154(b) by 103 days.

(21) Appl. No.: 11/965,247

(22) Filed: Dec. 27, 2007

(65) Prior Publication Data
US 2009/0015948 A1 Jan. 15, 2009

(30) Foreign Application Priority Data
Dec. 28, 2006 (JP) ............................. 2006-355727

(51) Int. Cl.
*G02B 15/14* (2006.01)
(52) U.S. Cl. ....................... 359/694; 359/821
(58) Field of Classification Search ................. 359/694, 359/696, 821–824; 369/44.15, 44.16; 396/79, 396/85, 529; 348/345, 374, 376
See application file for complete search history.

(56) References Cited

U.S. PATENT DOCUMENTS

2006/0181748 A1* 8/2006 Makii et al. ................. 358/500

FOREIGN PATENT DOCUMENTS

| JP | 2006-227103 A | 8/2006 |
| JP | 2006-201525 A | 3/2008 |

* cited by examiner

*Primary Examiner*—Joseph Martinez
(74) *Attorney, Agent, or Firm*—Cantor Colburn LLP

(57) ABSTRACT

A lens drive device may include a movable lens body provided with a lens, a support body which movably supports the movable lens body through a plate spring in an optical axis direction, and a magnetic drive mechanism for driving the movable lens body in the optical axis direction. The plate spring may include an outer side connecting part connected with the support body, an inner side connecting part connected with the movable lens body, and an arm part which is connected with the inner side connecting part and the outer side connecting part through an inner connecting portion and an outer connecting portion. The arm part may include a meandering part which comprises a plurality of extending parts which is extended in a radial direction is serially connected through inner side turning portions and outer side turning portions.

18 Claims, 6 Drawing Sheets

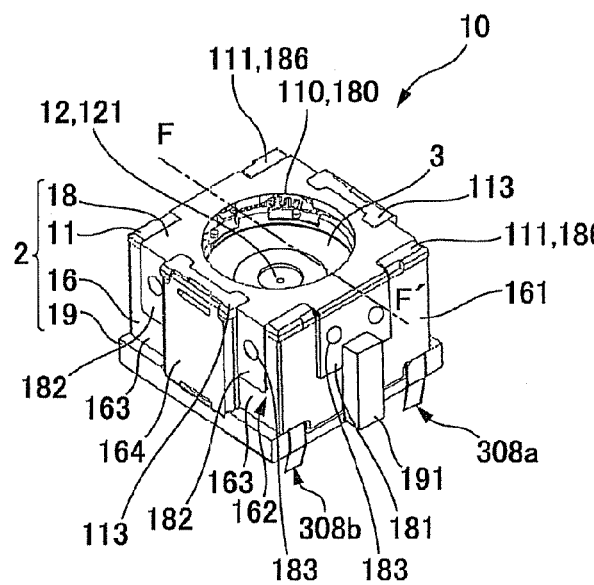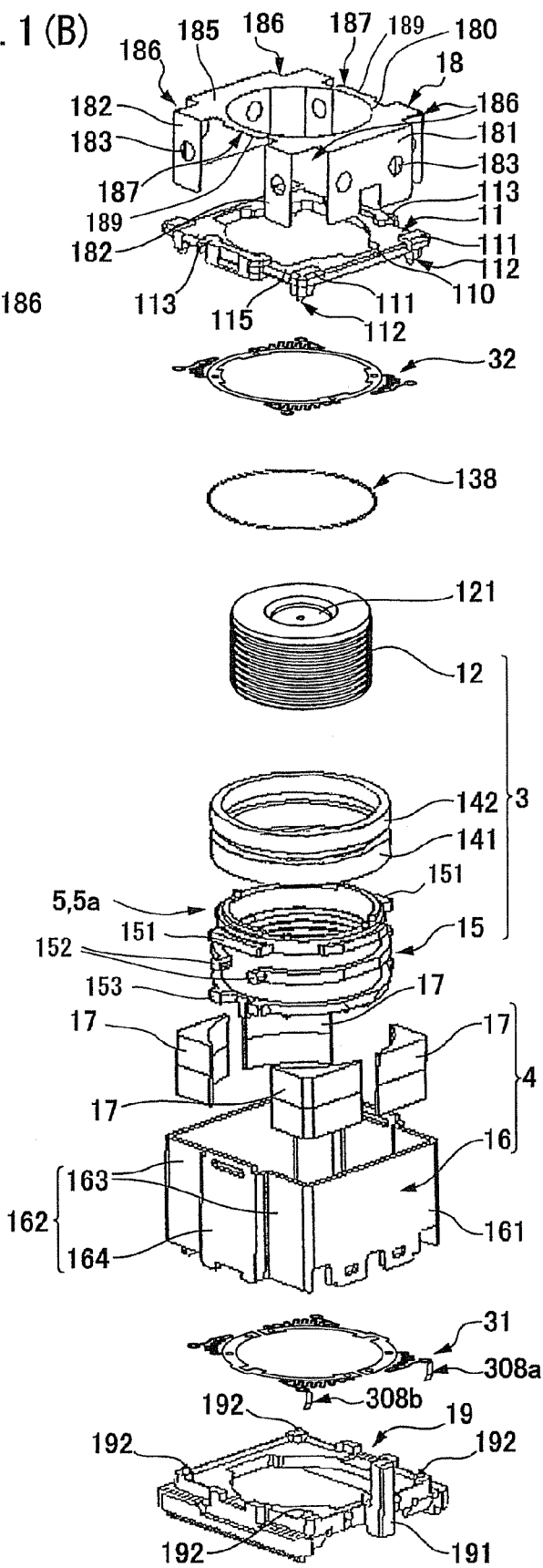
Fig. 1(A)
Fig. 1(B)

LENS DRIVE DEVICE

CROSS REFERENCE TO RELATED APPLICATION

The present invention claims priority under 35 U.S.C. §119 to Japanese Application No. 2006-355727 filed Dec. 28, 2006, which is incorporated herein by reference.

FIELD OF THE INVENTION

The present invention relates to a lens drive device in which a lens is driven in an optical axis direction to form an image of an object.

BACKGROUND OF THE INVENTION

In recent years, the use of a cellular phone having a camera has expanded. A portable device is provided with a lens drive device for driving and moving a lens in an optical axis direction. The lens drive device includes a movable lens body provided with a lens, a fixed body which movably supports the movable lens body in an optical axis direction through a plate spring, and a magnetic drive mechanism for driving the movable lens body in the optical axis direction. The plate spring includes an outer side connection part which is connected with the fixed body, an inner side connection part which is formed in a circular ring frame shape and connected with the movable lens body, and a plurality of arm parts which connects the outer side connection part with the inner side connection part. In the arm part, straight line portions which are extended in a circumferential direction or in a tangential direction are formed so as to have a plurality of zigzag turns on an outer peripheral side of the movable lens body (see Japanese Patent Laid-Open No. 2006-201525 and Japanese Patent Laid-Open No. 2006-227103).

In the plate spring as structured as described above, the arm part is extended between the outer side connection part and the inner side connection parts to exert elasticity. In this manner, the plate spring controls a moving amount in the optical axis direction of the movable lens body when the movable lens body is moved in the optical axis direction. Further, a portable device is easily subjected to vibration or impact because of property of being portably carried, but the vibration or the impact is absorbed by the arm part.

The present inventors propose a plate spring having a shape which is capable of coping with a case where an outside shape of a lens drive device is a rectangular parallelepiped shape. In this case, the plate spring is disposed in a small area which is sandwiched between a fixed body whose cross section in a direction perpendicular to the optical axis is in a rectangular shape and a movable lens body whose outer peripheral shape is circular. Therefore, in the plate spring, a space between the outer side connection part which is connected with the fixed body and the inner side connection part which is connected with the movable lens body becomes small and thus degree of freedom of design for the shape of the arm part and the like is decreased. Accordingly, like the structure as described in the above-mentioned Patent References, in the plate spring in which straight line portions of the arm part extended in the circumferential direction or in the tangential direction are formed so as to have a plurality of zigzag turns on an outer peripheral side of the movable lens body, the number of turning portions is reduced and thus sufficient elasticity cannot be secured. In addition, when the lens drive device receives a strong impact such as a dropping impact to cause the movable lens body to be moved intensely in a direction perpendicular to the optical axis direction or in a tilt direction, plastic deformation or breaking may easily occur in the plate spring and malfunction such as stroke failure may easily occur in the lens drive device.

SUMMARY OF THE INVENTION

In view of the problems described above, the present invention may provide a lens drive device which is superior in vibration proofing and impact resistance to a direction perpendicular to an optical axis direction and to an oblique direction (tilt direction) with respect to the optical axis even when arm parts of a plate spring are disposed in small regions.

Thus, in accordance with at least an embodiment of the present invention, a lens drive device comprises a movable lens body which is provided with a lens, a support body which movably supports the movable lens body through a plate spring in an optical axis direction, and a magnetic drive mechanism for driving the movable lens body in the optical axis direction. The plate spring comprises an outer side connecting part which is connected with the support body, an inner side connecting part which is connected with the movable lens body, and an arm part which is connected with the inner side connecting part and the outer side connecting part through an inner connecting portion and an outer connecting portion. Further, the arm part comprises a meandering part which comprises a plurality of extending parts which is extended in a radial direction is serially connected through inner side turning portions and outer side turning portions.

In accordance with at least an embodiment of the present invention, the plate spring for movably supporting the movable lens body in an optical axis direction is provided with an arm part between the outer side connecting part and the inner side connecting part. Further, the arm part comprises a meandering part which comprises a plurality of extending parts which is extended in a radial direction is serially connected through inner side turning portions and outer side turning portions. Therefore, different from a conventional case that the extending parts which are extended in a circumferential direction or a tangential direction are formed so as to have a plurality of zigzag turns on the outer peripheral side of the movable lens body, even when an area where the arm part can occupy around the movable lens body is small, a number of extending parts can be disposed and thus the number of the turning portions can be increased. Therefore, the present invention is superior in vibration proofing and impact resistance when the movable lens body is moved in the direction perpendicular to the optical axis direction or inclined in the oblique direction (tilt direction) with respect to the optical axis. Further, since the present invention is provided with rigidity that can sufficiently endure stress applied when the movable lens body is moved in the direction perpendicular to the optical axis direction or inclined in the oblique direction with respect to the optical axis, plastic deformation of the arm part can be avoided securely.

In accordance with at least an embodiment of the present invention, it is preferable that five or more extending parts are juxtaposed in the circumferential direction in the meandering part. According to this structure, even when the arm part is disposed in a small region, a meandering part can be formed which is provided with two or more inner side turning portions and two or more outer side turning portions. Therefore, stress can be sufficiently endured which is applied when the movable lens body is moved in the direction perpendicular to the optical axis direction or inclined in the oblique direction with respect to the optical axis.

In accordance with at least an embodiment of the present invention, it is preferable that the plurality of extending parts of the meandering part comprises extending straight line portions which are extended substantially parallel to each other.

In accordance with at least an embodiment of the present invention, it is preferable that a width dimension of the outer side turning portion is wider than a width dimension of the inner side turning portion. According to this structure, rigidity of the arm part in the radial direction can be enhanced.

In accordance with at least an embodiment of the present invention, it is preferable that the outer side turning portion curves with a larger radius of curvature than a radius of curvature of the inner side turning portion. According to this structure, even in a case that stress is concentrated on the outer side turning portions when the movable lens body is moved in the direction perpendicular to the optical axis direction or inclined in the oblique direction with respect to the optical axis, damage of the outer side turning portion can be prevented.

In accordance with at least an embodiment of the present invention, it is preferable that the meandering part comprises three or more inner side turning portions in the circumferential direction, and a gap space dimension between the inner side turning portion which is located on a center side of the meandering part in the circumferential direction and the inner side connecting part is wider than gap space dimensions between the inner side turning portions which are located on both end sides of the meandering part in the circumferential direction and the inner side connecting part. According to this structure, even when the movable lens body is largely moved in the direction perpendicular to the optical axis direction or largely inclined in the oblique direction with respect to the optical axis, the inner side turning portion does not contact with the inner side connecting part formed in a circular ring frame shape.

In accordance with at least an embodiment of the present invention, it is preferable that the meandering part is formed in an area which is deviated in the circumferential direction from an outer side position in a radial direction of a connection portion of the inner side connecting part with the arm part. In this case, specifically, it may be structured that the plate spring comprises a plurality of arm parts, and respective meandering parts of the plurality of the arm parts are formed on a same direction side in the circumferential direction from the outer side position in the radial direction of the connection portion of the inner side connecting part with the arm part. According to this structure, an occupied area of the portion including the movable lens body and the plate spring can be made small, a size of the entire lens drive device can be reduced.

In accordance with at least an embodiment of the present invention, it is preferable that a width dimension of the inner connecting portion is wider than a width dimension of the meandering part. According to this structure, although a large load is applied to the inner connecting portion, it is not damaged. Further, when the inner connecting portion is formed wider, a stress is applied to the arm part when the movable lens body is moved in the direction perpendicular to the optical axis direction or inclined in the oblique direction with respect to the optical axis. Therefore, the stress when the movable lens body is moved in the direction perpendicular to the optical axis direction or inclined in the oblique direction with respect to the optical axis can be absorbed efficiently.

In accordance with at least an embodiment of the present invention, it is preferable that the plate spring comprises a plurality of the arm parts, and the inner connecting portions of the plurality of the arm parts which are connected with the inner side connecting part are formed so that two extension lines of the inner connecting portions are substantially parallel to each other in an area where a center position of the inner side connecting part is interposed by the two extension lines and, alternatively, intersect at a position deviated from the center position of the inner side connecting part. According to this structure, the positions where the arm parts apply elasticity to the movable lens body are dispersed on a plane perpendicular to the optical axis direction and the spring constant of the plate spring can be made constant.

In accordance with at least an embodiment of the present invention, it is preferable that, when a virtual quadrangle of a square or a rectangle is drawn so as to surround the inner side connecting part, the meandering parts are disposed within areas corresponding to angular parts of the quadrangle.

In accordance with at least an embodiment of the present invention, it is preferable that, when a rectangle as the virtual quadrangle is drawn whose oppositely arranged long sides are contacted with the inner side connecting part, the arm parts are disposed on an inner side of the rectangle.

In accordance with at least an embodiment of the present invention, it is preferable that the support body is provided with a rectangular shape when viewed from the optical axis direction of the lens, and the arm parts are disposed within corner parts of the support body between the support body and the lens moving body.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(A) is an outside appearance perspective view showing a lens drive device in accordance with an embodiment of the present invention which is viewed from obliquely upward, and FIG. 1(B) is its exploded perspective view.

DETAILED DESCRIPTION OF THE PREFERRED EMBODIMENTS

A lens drive device in accordance with an embodiment of the present invention will be described below with reference to the accompanying drawings. A lens drive device described below may be mounted on various electronic devices in addition to a cellular phone with camera. For example, the lens drive device may be used in a thin type digital camera, a PHS, a PDA, a bar code reader, a monitoring camera, a camera for confirming a rear side of a car, a door having an optical authentication function and the like.

Figure 2:
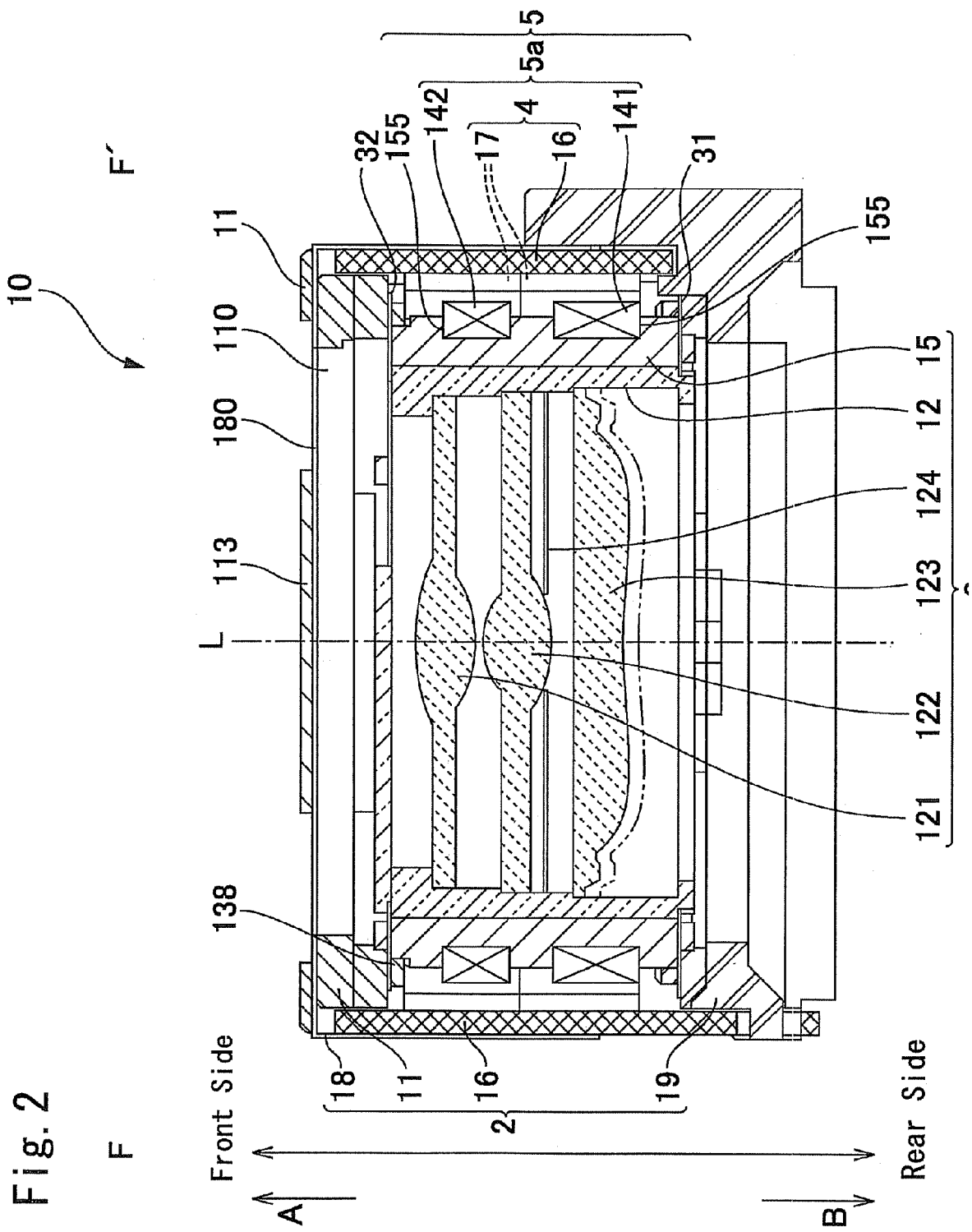
FIG. 2 is a cross-sectional view showing the lens drive device which is cut in the optical axis direction "L" at a position corresponding to the line of "F-F'" in FIG. 1(A).

FIG. 1(A) is an outside appearance perspective view showing a lens drive device in accordance with an embodiment of the present invention which is viewed from obliquely upward, and FIG. 1(B) is its exploded perspective view. FIG. 2 is a cross-sectional view showing the lens drive device which is cut in the optical axis direction "L" at a position corresponding to the line of "F-F'" in FIG. 1(A).

In FIGS. 1(A) and 1(B) and FIG. 2, the lens drive device 10 in this embodiment is a thin type camera used in a cellular phone with camera or the like in which, for example, three pieces of lenses 121, 122 and 123 are moved in forward/backward directions of an "A" direction (front side) approaching to an object to be imaged (object side) and a "B" direction (rear side) approaching to an opposite side (image side) to the object along an optical axis direction "L". The lens drive device 10 is formed in a rectangular parallelepiped shape. The lens drive device 10 generally includes a movable lens body 3 provided with a cylindrical lens holder 12 on which three pieces of lenses 121, 122 and 123 and a fixed diaphragm 124 are integrally held, a lens drive mechanism 5 for moving the movable lens body 3 along the optical axis direction "L", and a fixed body 2 as a support body on which the lens drive mechanism 5 and the movable lens body 3 are mounted. The movable lens body 3 is provided with a cylindrical sleeve 15 and a cylindrical lens holder 12 is fixed on an inner side of the cylindrical sleeve 15.

In this embodiment, the fixed body 2 includes a rectangular base 19 for holding an image sensor element (not shown) on an image side, a rectangular case 11 disposed on an object to be imaged side, and a plate-shaped cover 18 for covering the object side of the case 11. Center portions of the case 11 and the plate-shaped cover 18 are respectively formed with circular incident apertures 110 and 180 for taking a reflected light from an object to the lenses. The fixed body 2 is further provided with a rectangular tubular shaped back yoke 16 which is held between the base 19 and the case 11. The back yoke 16 structures an interlinkage magnetic field generation body 4 together with drive magnets 17 described below for generating an interlinkage magnetic field to drive coils 141 and 142.

The lens drive mechanism 5 includes a first drive coil 141 and a second drive coil 142 formed in a circular ring shape, which are disposed in two stages on an outer peripheral face of the sleeve 15 in the optical axis direction, and the interlinkage magnetic field generation body 4 for generating interlinkage magnetic field to the drive coils 141 and 142. A magnetic drive mechanism 5a is structured by using the drive coils 141 and 142 and the interlinkage magnetic field generation body 4. The interlinkage magnetic field generation body 4 includes four drive magnets 17 which face to the drive coils 141 and 142 on the outer peripheral side and a square-cylindrical back yoke 16 made of a ferromagnetic plate such as a steel plate. Four drive magnets 17 are respectively fixed to four corner parts on the inner peripheral face of the back yoke 16. Four drive magnets 17 are respectively divided into two pieces in the optical axis direction "L" and each of them is magnetized so that an inner side face and an outer side face are formed to be different poles from each other. Further, in each of the four drive magnets 17, for example, an upper half portion is formed such that its inner side face is magnetized in an "N"-pole and its outer side face is magnetized in an "S"-pole, and an lower half portion is formed such that its inner side face is magnetized in an "S"-pole and its outer side face is magnetized in an "N"-pole.

The back yoke 16 is sandwiched between the base 19 and the case 11. A side face of the back yoke 16 is exposed to structure a side face part of the lens drive device 10.

The lens drive mechanism 5 includes, in addition, a first plate spring 31 which is sandwiched between the back yoke 16 and the base 19 and a second plate spring 32 which is sandwiched between the back yoke 16 and the case 11. Each of the first plate spring 31 and the second plate spring 32 is formed of a metal thin plate and, since their thicknesses in the optical axis direction "L" are the same each other, productivity is high. In accordance with an embodiment, the thicknesses in the optical axis direction "L" of the first plate spring 31 and the second plate spring 32 may be changed appropriately. Further, it may be structured that material for structuring the first plate spring 31 and the second plate spring 32 are different from each other but their thicknesses in the optical axis direction "L" are the same each other.

The back yoke 16 is longer than a dimension in the optical axis direction "L" of a region where the drive coils 141 and 142 are disposed and longer than a dimension in the optical axis direction "L" of the drive magnet 17. Therefore, leakage flux from magnetic paths can be reduced which are structured between the drive magnet 17 and the first drive coil 141 and between the drive magnet 17 and the second drive coil 142 and thus linearity between a moving quantity of the sleeve 15 and an electric current flowing through the drive coils 141 and 142 can be improved. Accordingly, in the back yoke 16 in this embodiment, for example, even when the back yoke 16 having a shape which covers the side faces and the under face or the upper face of the drive coils 141 and 142 is not used, effects such as reducing the above-mentioned leakage flux can be obtained.

In addition, the lens drive mechanism 5 is provided with a circular ring shaped magnetic piece 138 which is held on an upper end of the sleeve 15. The magnetic piece 138 applies an urging force in the optical axis direction "L" to the movable lens body 3 by an attractive force acting between the drive magnet 17 and the magnetic piece 138. Therefore, since the movable lens body 3 is prevented from being displaced with its own weight at the time of no energization, a desired posture of the movable lens body 3 can be maintained. Further, since the magnetic piece 138 acts as a kind of back yoke, leakage flux from the magnetic paths can be reduced which are structured between the drive magnet 17 and the first drive coil 141 and between the drive magnet 17 and the second drive coil 142.

The lens drive device 10 is formed with terminals 308a and 308b to the drive coils 141 and 142. The structure of the terminals 308a and 308b will be described below together with the first plate spring 31 and the second plate spring 32.

Figure 3A:
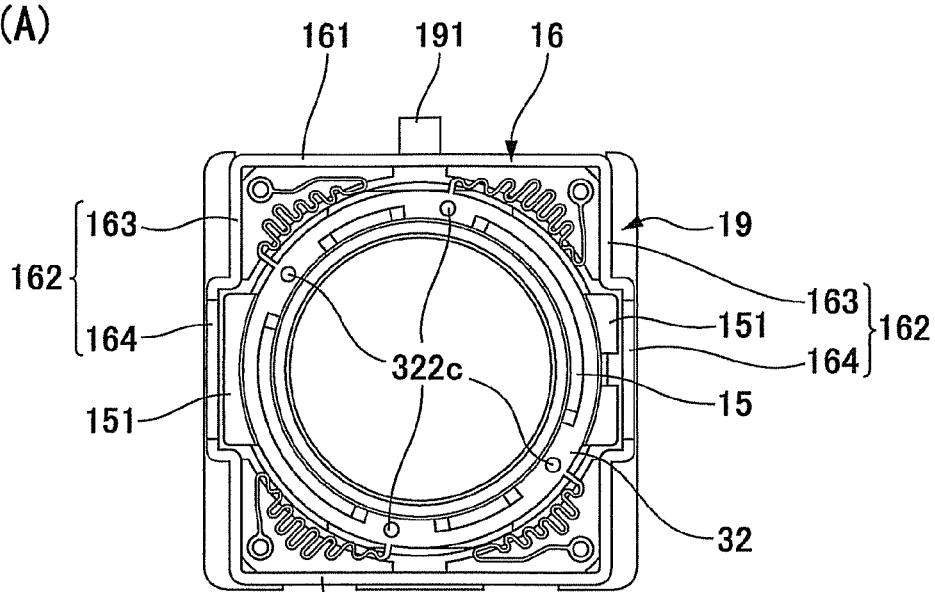
FIG. 3(A) is a structural plan view showing a lens drive device in accordance with an embodiment of the present invention in which a case and a plate-shaped cover are detached and which is viewed from an object side.
Figure 3B:
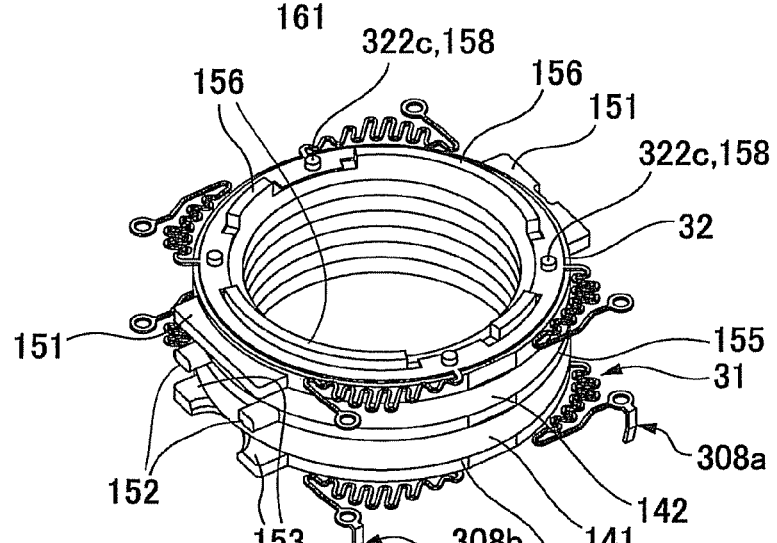
FIG. 3(B) is a perspective view showing a state where a first plate spring and a second plate spring are mounted on a sleeve which is viewed from the object side.
Figure 3C:
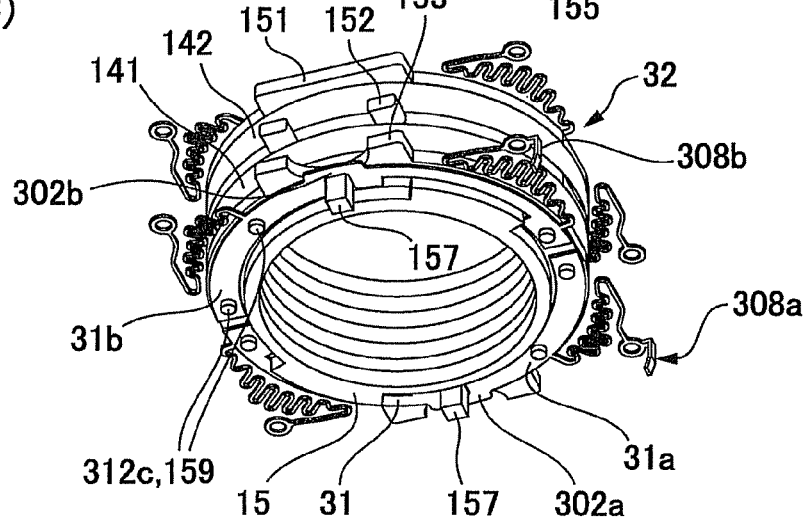
FIG. 3(C) is a perspective view showing a state where the first plate spring and the second plate spring are mounted on the sleeve which is viewed from an image sensor element side.

FIG. 3(A) is a structural plan view showing a lens drive device in accordance with an embodiment of the present invention in which a case and a plate shaped cover are detached and which is viewed from an object to be imaged. FIG. 3(B) is a perspective view showing a state where a first plate spring and a second plate spring are mounted on a sleeve which is viewed from an object side, and FIG. 3(C) is a perspective view showing a state where the first plate spring and the second plate spring are mounted on the sleeve which is viewed from an image sensor element side. A detailed structure of the fixed body 2 and the sleeve 15 will be described below with reference to FIG. 1(A) through FIG. 3(C).

As shown in FIG. 1(B) and FIG. 3(A), an outer peripheral shape of the back yoke 16 is roughly rectangular and a pair of side face parts 161 opposite to each other is formed in a flat shape. A pair of other side face parts 162 opposite to each other is formed at a center portion with a protruded part 164 which protrudes on an outer side in a step shape because both of end parts 163 are recessed inside. Therefore, when viewed from the optical axis direction "L", rectangular regions which are surrounded by the side face parts 161 and both the end parts 163 of the side face part 162 of the back yoke 16 are spaces where the plate springs 31 and 32 are to be disposed.

The case 11 covers the back yoke 16 from an object to be imaged side and is provided with a plate part 115 whose center portion is formed with an incident aperture 110. Protruded parts 111 extending to the object side and protruded parts 112 extending to the imaging element side are formed at four corners of the plate part 115. A pair of side parts of the plate part 115 opposite to each other is formed with holding parts 113 on an upper face of the plate part 115 for holding engagement parts 189 in a circumferential direction of a plate-shaped cover 18 described below. Further, protruded parts 192 extending to the object side are formed at four corners of the base 19 and a column shaped member 191 is extended toward the object side from a side face of the base 19. The protruded parts 192 of the base 19 and the protruded parts 112 of the case 11 are used when the plate springs 31 and 32 described below are to be connected to the fixed body 2.

The plate-shaped cover 18 is structured by using a non-magnetic thin plate (for example, SUS304), and covers the case 11 from the object side, and is provided with a top plate part 185 whose center portion is formed with the incident aperture 180. The top plate part 185 is formed in a roughly rectangular shape and rectangular cut-out parts 186 and 187 are respectively formed at its four corners and center portions of side parts opposite to each other. A pair of engaging leg parts 181 is extended downward from a pair of opposite side portions of the top plate part 185. Further, a pair of engaging leg parts 182 is respectively extended downward from both near end portions sandwiching the cut-out parts 187 of a pair of other opposite side portions of the top plate part 185. Each of the engaging leg parts 181 and 182 is formed with a through hole 183 in the vicinity of its center portion.

Therefore, in a state where the base 19, the first flat spring 31, the back yoke 16, the second flat spring 32 and the case 11 have been superposed, when the plate-shaped cover 18 is going to be superposed, the cut-out parts 187 of the plate-shaped cover 18 are respectively fitted to the holding parts 113 of the case 11 and thus the plate-shaped cover 18 is disposed on the upper face of the case 11. In this case, the protruded parts 111 formed at the four corners of the case 11 are disposed at the cut-out parts 186 formed at the four corners of the top plate part 185. Further, the engaging leg parts 181 abut with the side face parts 161 of the back yoke 16, and the engaging leg parts 182 abut with the side face parts 162 of the back yoke 16 and are disposed so as to sandwich the protruded part 164 therebetween. In the engaging leg parts 181 and 182 disposed in this manner, the plate-shaped cover 18 may be fixed to the back yoke 16 such that, for example, an anaerobic adhesive is coated through the respective through holes 183 to fix the engaging leg parts 181 and 182 to the side face parts 161 and 162 and, in addition, the side face parts 161 and 162 and the engaging leg parts 181 and 182 are joined with each other by laser welding.

As shown in FIG. 1(B) and FIGS. 3(A) through 3(C), flange-shaped abutting parts 151, 152 and 153 are respectively formed on a side face of the sleeve 15 in the optical axis direction "L", i.e., at an end part of the object side, at a center portion and at an end part of the imaging element side so as to extend to its outer peripheral side. These abutting parts 151, 152 and 153 are disposed on both sides of the sleeve 15. Further, two groove parts 155 are circumferentially formed between the abutting parts 151, 152 and 153 in the circumferential direction on the side face of the sleeve 15 and drive coils 141 and 142 are disposed on an outer peripheral face of the sleeve 15 by winding a coil around the two groove parts 155.

In addition, as shown in FIG. 3(B), fitting parts 156 extending in the circumferential direction are formed on the end part on the object side of the sleeve 15 and, as shown in FIG. 3(C), column shaped parts 157 standing toward the image sensor element side at opposite positions to each other are formed on the end part of the image sensor element side of the sleeve 15. These are used when the plate springs 31 and 32 described below are to be mounted on the sleeve 15.

When the sleeve 15 (movable lens body 3) formed as described above is to be disposed in the fixed body 2, the abutting parts 151, 152 and 153 are disposed on the inside of the protruded parts 164 of the back yoke 16. Since disposed as described above, when the movable lens body 3 is moved by an impact or the like in a direction perpendicular to the optical axis direction "L", the abutting parts 151, 152 and 153 are abutted with the inside of the protruded part 164 of the back yoke 16 and thus a further displacement of the movable lens body 3 in the direction perpendicular to the optical axis direction "L" is prevented. Any face such as a round face or a rectangular face may be formed as a face of the abutting parts 151, 152 and 153 which are to be abut with the inside of the protruded part 164 of the back yoke 16.

Figure 4A:
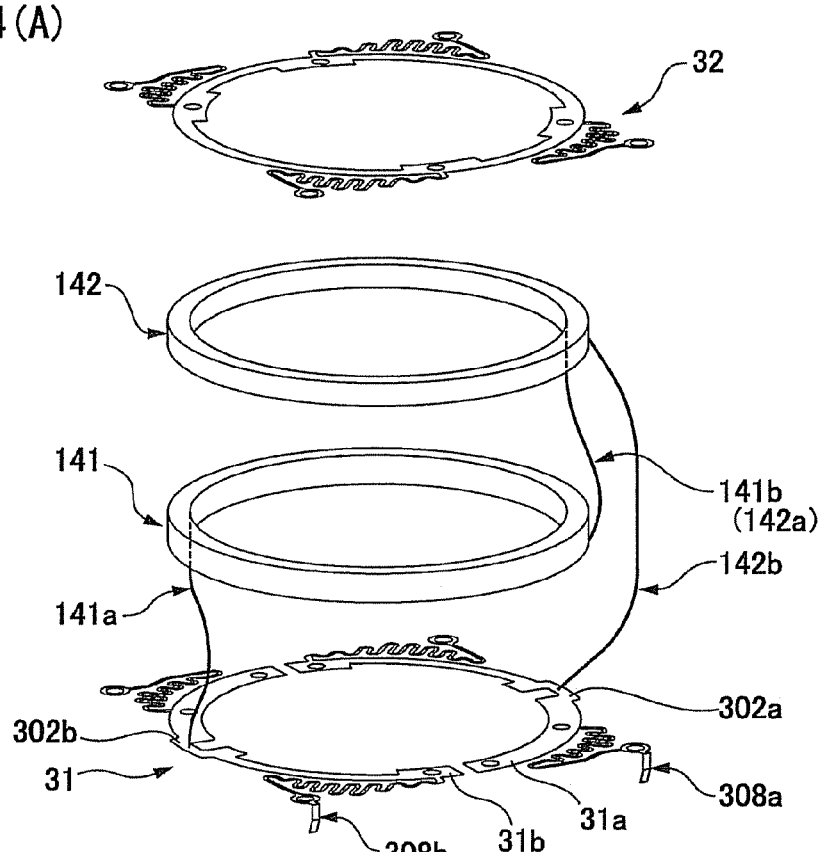
FIGS. 4(A) and 4(B) are respectively schematic perspective views showing connection methods of drive coils to plate springs in accordance with an embodiment of the present invention.
Figure 4B:
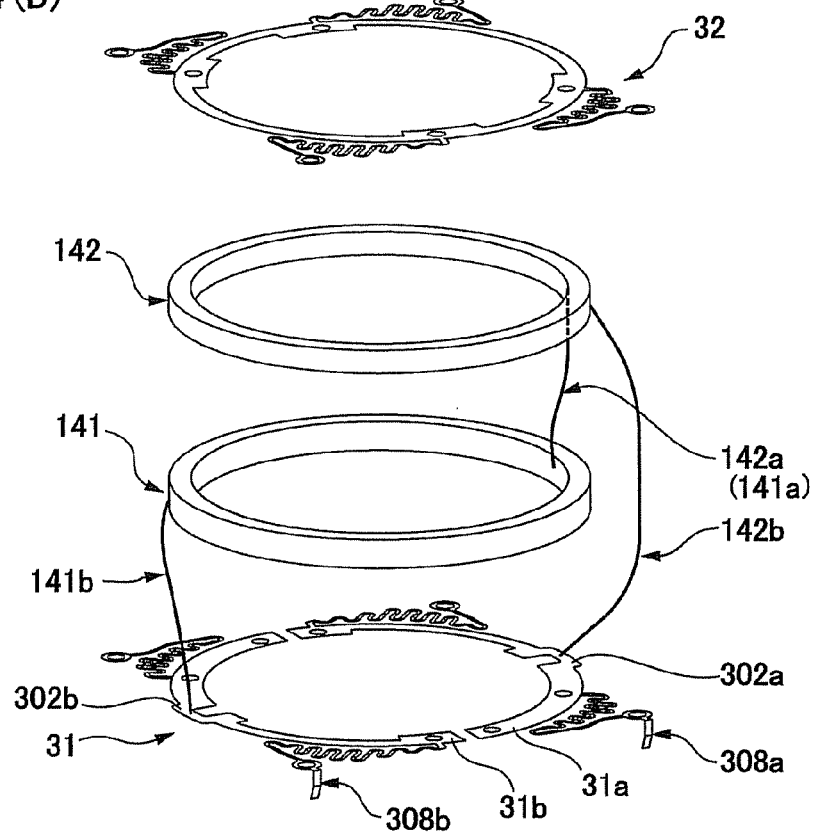

FIGS. 4(A) and 4(B) are respectively schematic perspective views showing connection methods of drive coils to plate springs in accordance with an embodiment of the present invention.

As shown in FIGS. 3(B) and 3(C), in the lens drive device 10 in accordance with this embodiment, the first plate spring 31 and the second plate spring 32 are connected to an upper end and a lower end of the sleeve 15 (movable lens body 3). Both of the plate springs 31 and 32 are provided with a structure which will be described below so that they support the movable lens body 3 so as to be displaceable in the optical axis direction "L" and serve to prevent rotation of the movable lens body 3 around the optical axis.

In this embodiment, the first plate spring 31 and the second plate spring 32 are formed in roughly the same shapes, and the first plate spring 31 and the second plate spring 32 are disposed so as to face each other.

In this embodiment, the second plate spring 32 is formed as one body. On the other hand, the first plate spring 31 comprises two pieces of spring pieces 31*a* and 31*b* which are divided electrically. The spring pieces 31*a* and 31*b* are formed with terminals 308*a* and 308*b*. Therefore, as shown in FIGS. 4(A) and 4(B), an electrical power can be supplied to the drive coils 141 and 142 through the terminals 308*a* and 308*b* by electrically connecting coil ends of the drive coils 141 and 142 with the spring pieces 31*a* and 31*b*. In accordance with an embodiment, the first plate spring 31 comprising the spring pieces 31*a* and 31*b* has a similar structure to the second plate spring 32 in a plan view when the spring pieces 31*a* and 31*b* are disposed.

In the first plate spring 31 and the second plate spring 32 which are structured as described above, in order to utilize the first plate spring 31 for supplying power to the drive coils 141 and 142, for example, as shown in FIG. 4(A), a winding start wire 141*a* drawn from an inner peripheral side of the drive coil 141 is soldered with a coil connection part 302*b* which is formed in the spring piece 31*b*. Further, a winding end wire 142*b* drawn from an outer peripheral side of the drive coil 142 is soldered with a coil connection part 302*a* which is formed in the spring piece 31*a*. Moreover, a winding end wire 141*b* drawn from an outer peripheral side of the drive coil 141 is connected with a winding start wire 142*a* drawn from an inner peripheral side of the drive coil 142. When structured as described above, the drive coils 141 and 142 are serially connected with each other and winding directions of the drive coils 141 and 142 can be aligned with each other. When the drive coils 141 and 142 are disposed as described above, magnetizing directions of the upper half portion and the lower half portion of the drive magnet 17 are set to be the same.

On the other hand, in the example shown in FIG. 4(B), a winding end wire 141*b* drawn from an outer peripheral side of the drive coil 141 is soldered with the coil connection part 302*b* formed in the spring piece 31*b* and a winding end wire 142*b* drawn from an outer peripheral side of the drive coil 142 is soldered with the coil connection part 302*a* formed in the spring piece 31*a*. In this case, a winding start wire 141*a* drawn from an inner peripheral side of the drive coil 141 is connected with a winding start wire 142*a* drawn from an inner peripheral side of the drive coil 142. When structured as described above, the drive coils 141 and 142 are serially connected with each other. In this case, winding directions of the drive coils 141 and 142 can be reversed. Therefore, like the embodiment described above, this embodiment can be applied to a case where magnetizing directions are reversed in the upper half portion and the lower half portion of the drive magnet 17.

When the coil ends of the drive coils 141 and 142 will be connected with the coil connection parts 302*a* and 302*b*, the coil ends are wound around the column shaped parts 157 formed on the sleeve 15 which are shown in FIG. 3(C) and the coil ends are joined with the coil connection parts 302*a* and 302*b* by soldering and then the column shaped parts 157 are welded. According to this embodiment, contamination can be prevented from accumulating on the coil connection parts 302*a* and 302*b* with which the coil ends are connected.

In the lens drive device 10 in accordance with this embodiment, as shown in FIG. 2, the movable lens body 3 is normally located on the image sensor element side (image side). Specifically, a bottom end face (image side face) of the sleeve 15 is abutted with an upper face (front side face) of the base 19.

In this state, when an electric current in a prescribed direction is supplied to the drive coils 141 and 142, the drive coils 141 and 142 are respectively subjected to an electromagnetic force in an upward direction (front side). Therefore, the sleeve 15 on which the drive coils 141 and 142 are fixed starts to move on the object side (front side). At this time, elastic forces which respectively restrict movement of the sleeve 15 are generated between the plate spring 32 and the front end of the sleeve 15 and between the plate spring 31 and the rear end of the sleeve 15. Therefore, when an electro-magnetic force that is going to move the sleeve 15 to a front side and an elastic force which restricts the movement of the sleeve 15 are balanced with each other, the sleeve 15 is stopped. Further, when an electric current in a reverse direction is supplied to the drive coils 141 and 142, the drive coils 141 and 142 receive an electromagnetic force downward (rear side) respectively.

In this case, when a current quantity to be supplied to the drive coils 141 and 142 and elastic forces acting on the sleeve 15 by the plate springs 31 and 32 are adjusted, the sleeve 15 (movable lens body 3) can be stopped at a desired position. Further, an urging force acting between the magnetic piece 138 which is held in the movable lens body 3 and the drive magnet 17 is also utilized and thus a size of the magnetic drive mechanism 5*a* for generating a driving force in the optical axis direction "L" in the movable lens body 3 can be reduced.

In addition, in this embodiment, the plate springs 31 and 32 are used where a linear relationship is established between an elastic force (stress) and a displacement amount (strain amount). Therefore, linearity between a moving quantity of the sleeve 15 and an electric current supplied to the drive coils 141 and 142 can be improved. Further, since two elastic members which are the plate springs 31 and 32 are used, large balanced forces are applied to the sleeve 15 in the optical axis direction "L" when the sleeve 15 is stopped. As a result, even when another force such as a centrifugal force or an impulsive force is acted in the optical axis direction "L", the sleeve 15 can be further stably stopped. In addition, in the lens drive device 10, the sleeve 15 is stopped by utilizing balance between an electro-magnetic force and an elastic force instead of colliding with a collision member for stoppage (buffer member) and thus occurrence of collision noise can be prevented.

Figure 5A:
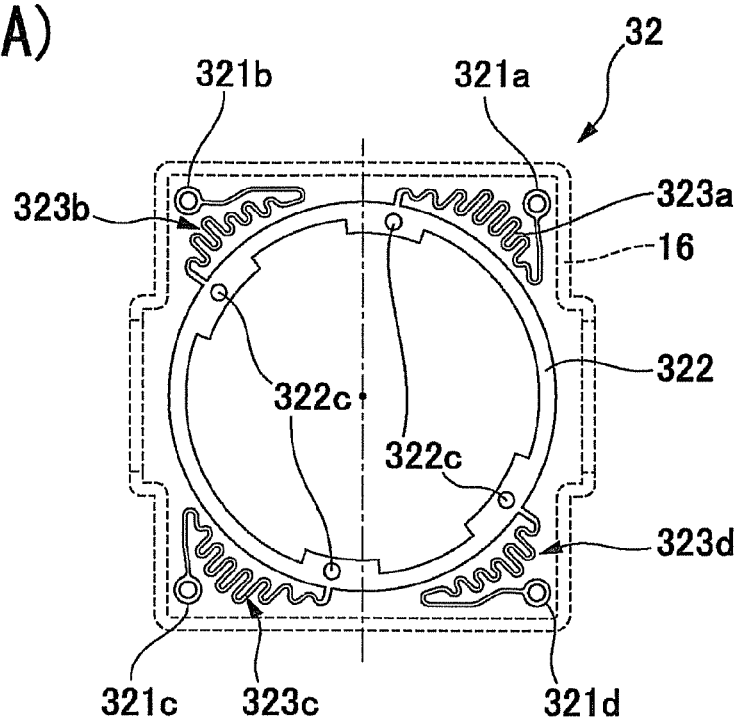
FIGS. 5(A) and 5(B) are respectively plan views showing a first plate spring and a second plate spring which are used in a lens drive device in accordance with an embodiment of the present invention.
Figure 5B:
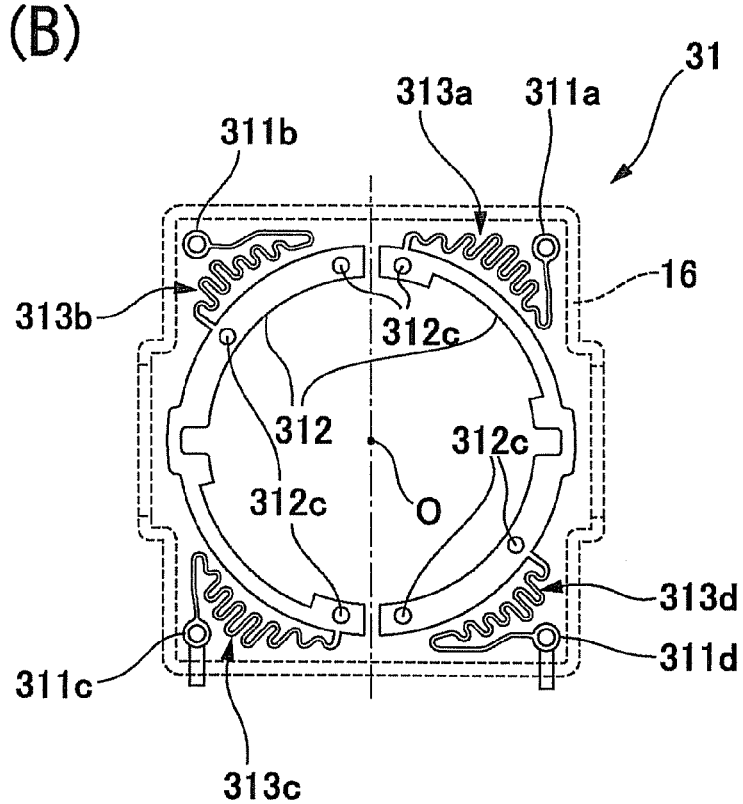
Figure 6A:
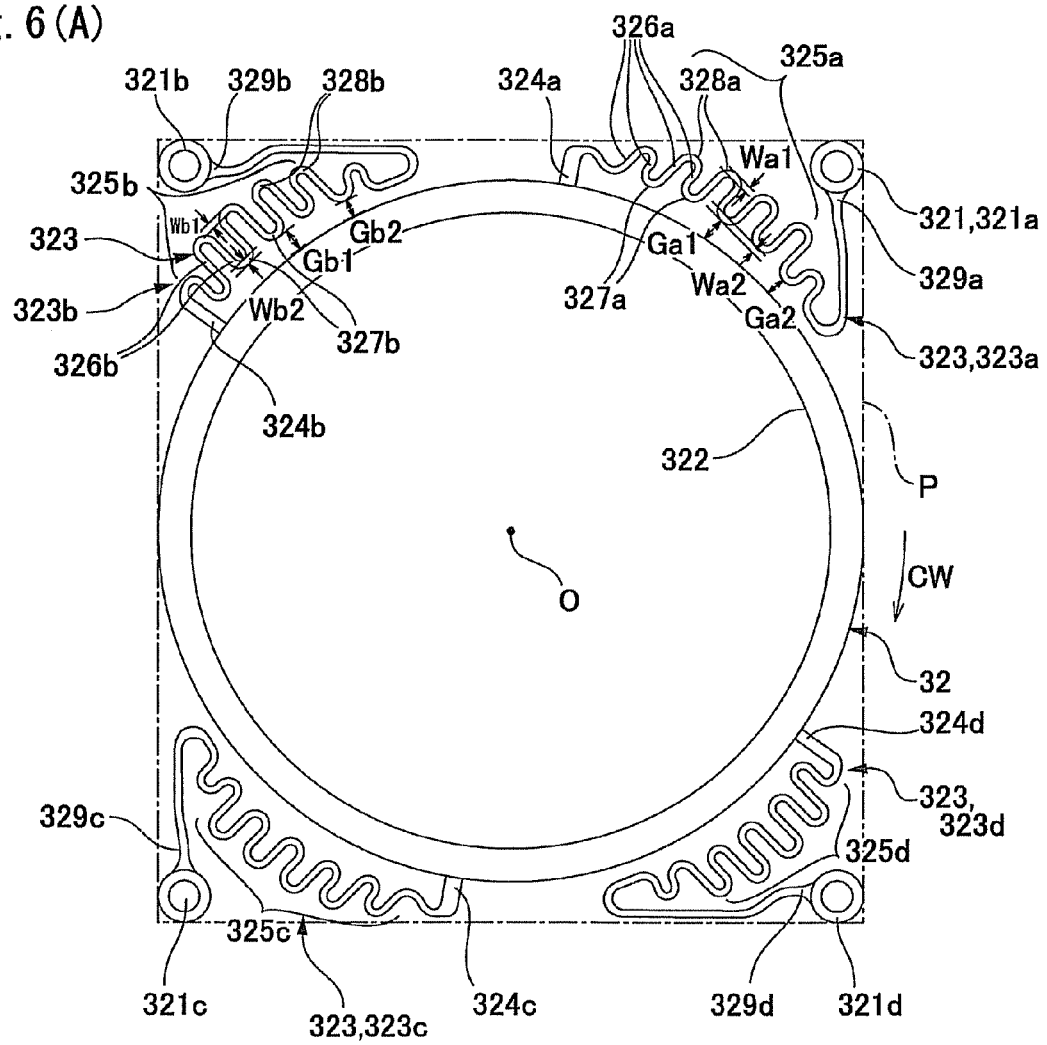
FIGS. 6(A), 6(B) and 6(C) are enlarged plan views showing a structure of the second plate spring shown in FIGS. 5(A) and 5(B).
Figure 6C:
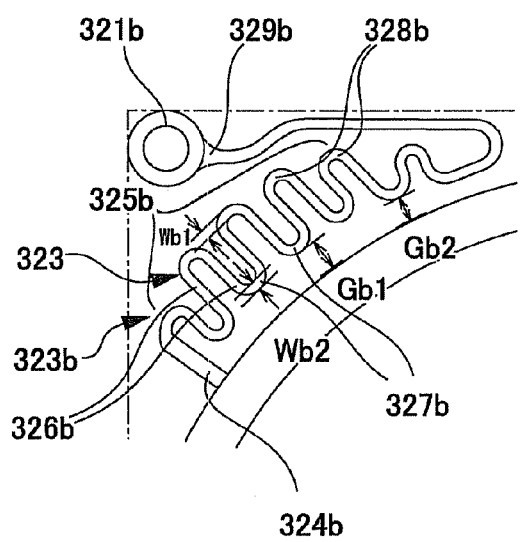
Figure 6B:
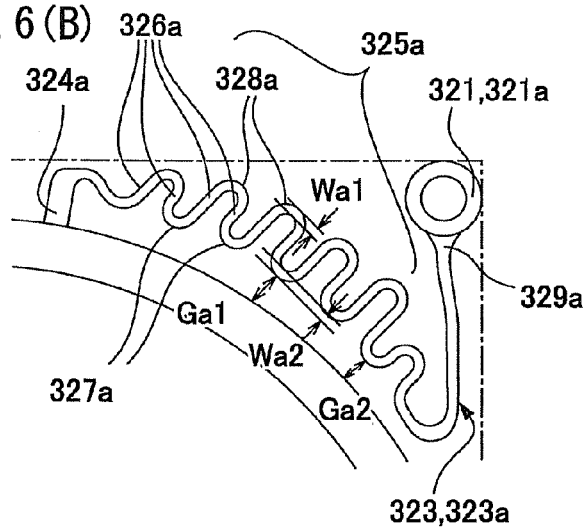

FIGS. 5(A) and 5(B) are respectively plan views showing the second plate spring 32 and the first plate spring 31 which are used in the lens drive device in accordance with an embodiment of the present invention. FIGS. 6(A), 6(B) and 6(C) are enlarged plan views showing a structure of the second plate spring 32 which is used in the lens drive device in accordance with an embodiment of the present invention.

As shown in FIGS. 3(A), 3(B) and FIG. 5(A), the second plate spring 32 includes four small circular ring shaped outer side connecting parts 321*a*, 321*b*, 321*c* and 321*d* which are held by the fixed body 2, a circular ring frame-shaped inner side connecting part 322 which is connected with the upper end of the sleeve 15, and four arm parts 323*a*, 323*b*, 323*c* and 323*d* which connect the inner side connecting part 322 with the outer side connecting part 321, i.e., the circular ring shaped outer side connecting parts 321*a*, 321*b*, 321*c* and 321*d*. The four outer side connecting parts 321*a* through 321*d* are respectively disposed at four corners of the rectangular back yoke 16 which structures the fixed body 2. The protruded parts 112 formed in the case 11 are inserted into holes of the outer side connecting parts 321*a* through 321*d* and the second plate spring 32 is sandwiched between the case 11 and the back yoke 16. In this case, insulation is applied between the back yoke 16 and the second plate spring 32. The inner side connecting part 322 is formed with a plurality of small holes 322*c*. In a state where small projections 158 formed on the upper end part of the sleeve 15 are fitted into the small holes 322*c*, the inner side connecting part 322 is connected with the upper end part of the sleeve 15.

Further, as shown in FIG. 3(C) and FIG. 5(B), the first plate spring 31 has a similar structure to the second plate spring 32 in a plan view when the spring pieces 31*a* and 31*b* are disposed. In other words, the first plate spring 31 includes four small circular ring shaped outer side connecting parts 311*a*, 311*b*, 311*c* and 311*d* which are held by the fixed body 2, a circular ring frame-shaped inner side connecting part 312 which is connected with the lower end of the sleeve 15, and four arm parts 313*a*, 313*b*, 313*c* and 313*d* which connect the inner side connecting part 312 with the outer side connecting part 311, i.e., four small circular ring shaped outer side connecting parts 311*a*, 311*b*, 311*c* and 311*d*. In this embodiment, the inner side connecting part 312 is divided into two pieces. The four outer side connecting parts 311a through 311d are respectively disposed at four corners of the rectangular back yoke 16 which structures the fixed body 2. The protruded parts 192 formed in the base 19 are inserted into holes of the outer side connecting parts 311a through 311d, and the first plate spring 31 is sandwiched between the base 19 and the back yoke 16. The inner side connecting part 322 is formed with a plurality of small holes 312c. The inner side connecting part 312 and the lower end part of the sleeve 15 are connected with each other in a state where the small projections 159 formed on the lower end part of the sleeve 15 are fitted into the small holes 312c.

Next, detailed structures of the plate springs 31 and 32 will be described below with reference to FIGS. 6(A), 6(B) and 6(C). The detailed structure of the second plate spring 32 will be described as an example for both the first plate spring 32 and the second plate spring 32.

In FIG. 6(A), in the four outer side connecting parts 321a through 321d of the second plate spring 32 which are disposed in a circumferential direction, the two outer side connecting parts 321a and 321c are disposed at point symmetrical positions with an optical axis "O" as its center and the two outer side connecting parts 321b and 321d are also disposed at point symmetrical positions with an optical axis "O" as its center. Further, two arm parts 323a and 323c of four arm parts 323 are provided with a point symmetrical structure with the optical axis "O" as its center and two arm parts 323b and 323d are provided with a point symmetrical structure with the optical axis "O" as its center.

As shown in FIGS. 6(A) and 6(B), the arm part 323a of the arm parts 323 is connected with the inner side connecting part 322 through an inner connecting portion 324a and is connected with the outer side connecting part 321 through an outer connecting portion 329a.

The arm part 323a is provided with a meandering part 325a in which twelve straight portions 326a in total as an extending part that is extended in a radial direction of the circular inner side connecting part 322 are serially-connected through an inner side turning portion 327a and an outer side turning portion 328a. In this embodiment, the twelve straight portions 326a are extended in roughly parallel to each other and juxtaposed in the circumferential direction. Both of the inner side turning portion 327a and the outer side turning portion 328a are formed as a curved portion formed in a circular arc shape.

The arm part 323a is not formed with the same width, in other words, a width dimension of the straight portion 326a is continuously increased from an inner side to an outer side in a radial direction. Therefore, when the inner side turning portion 327a is compared with the outer side turning portion 328a, a width dimension "Wa1" of the outer side turning portion 328a is set to be a little wider than a width dimension "Wa2" of the inner side turning portion 327a. Further, when the inner side turning portion 327a is compared with the outer side turning portion 328a, the outer side turning portion 328a is formed in a circular arc shape having a little larger radius of curvature than that of the inner side turning portion 327a. In addition, in the twelve straight portions 326a of the meandering part 325a, a straight portion 326a on a center side in the circumferential direction is longer than a straight portion 326a which is located on both end sides. Further, a gap space dimension "Ga1" between an inner side turning portion 327a which is located on a center side in the circumferential direction and the inner side connecting part 322 is set to be wider than a gap space dimension "Ga2" between an inner side turning portion 327a which is located on both end sides in the circumferential direction and the inner side connecting part 322. In addition, a width dimension of the inner connecting portion 324a is wider than that of the meandering part 325a and furthermore, its width dimension continuously increases toward the inner side connecting part 322. In this embodiment, a width dimension of the outer connecting portion 329a also continuously increases to the outer side connecting part 321 but the outer connecting portion 329a has a similar width dimension to the meandering part 325a. However, similarly to the inner connecting portion 324a, it may be structured that the width dimension of the outer connecting portion 329a also continuously increases toward the outer side connecting part 321 and the outer connecting portion 329a has a wider width dimension than that of the meandering part 325a. In addition, in this embodiment, the width of the straight portion of the outer connecting portion 329a is appropriately adjusted to adjust a spring constant of the second plate spring 32 in a predetermined value.

In the embodiment described above, a width dimension of the straight line portion 326a is continuously increased from the inner side to the outer side in the radial direction and the width dimension "Wa1" of the outer side turning portion 328a is set to be a little wider than the width dimension "Wa2" of the inner side turning portion 327a. Further, the outer side turning portion 328a is formed in a circular arc shape having a little larger radius of curvature than that of the into inner side turning portion 327a. In addition, in the meandering part 325a comprising twelve (12) straight line portions 326a, straight line portions 326a on the center side in the circumferential direction are longer than straight line portions 326a located on both end sides and the gap space dimensions "Ga1" between the inner side turning portions 327a located on the center side in the circumferential direction and the inner side connecting part 322 are set to be wider than the gap space dimensions "Ga2" between the inner side turning portions 327a located on both end sides in the circumferential direction and the inner side connecting part 322. However, the present invention does not always require all of the above-mentioned structures. Depending on required characteristics or situation of a space for arrangement, the width dimension "Wa1" may be appropriately wider than the width dimension "Wa2", or the radius of curvature of the outer side turning portion 328a may be appropriately larger than the radius of curvature of the inner side turning portion 327a, or the gap space dimension "Ga1" may be appropriately wider than the gap space dimensions "Ga2".

The arm part 323c is connected with the inner side connecting part 322 through the inner connecting portion 324c and is connected with the outer side connecting part 321c through the outer connecting portion 329c. A structure of the meandering part 325c and the like are similar to those of the arm part 323a and thus their description is omitted.

Next, similarly to the arm parts 323a and 323c, the arm part 323b is also connected with the inner side connecting part 322 through the inner connecting portion 324b and is connected with the outer side connecting part 321 through the outer connecting portion 329b.

As shown in FIGS. 6(A) and 6(B), the arm part 323b is provided with a meandering part 325b in which twelve straight portions 326b in total as an extending part that is extended in the radial direction are serially-connected through an inner side turning portion 327b and an outer side turning portion 328b. In this embodiment, the twelve straight portions 326b are extended in roughly parallel to each other and juxtaposed in the circumferential direction. Both of the inner side turning portion 327b and the outer side turning portion 328b are formed as a curved portion in a circular arc-shape.

The arm part 323b is not formed with the same width, in other words, a width dimension of the straight portion 326b is continuously increased from an inner peripheral side to an outer peripheral side. Therefore, when the inner side turning portion 327b is compared with the outer side turning portion 328b, a width dimension "Wb1" of the outer side turning portion 328b is set to be a little wider than a width dimension "Wb2" of the inner side turning portion 327b. Further, when the inner side turning portion 327b is compared with the outer side turning portion 328b, the outer side turning portion 328b is formed in a circular arc shape having a little larger radius of curvature than that of the inner side turning portion 327b. In addition, in the twelve straight portions 326b of the meandering part 325a, a straight portion 326a on a center side in the circumferential direction is longer than a straight portion 326a which is located on both end sides. Further, a gap space dimension "Gb1" between an inner side turning portion 327b which is located on a center side in the circumferential direction and the inner side connecting part 322 is set to be wider than a gap space dimension "Gb2" between an inner side turning portion 327b which is located on both end sides in the circumferential direction and the inner side connecting part 322. In addition, a width dimension of the inner connecting portion 324b is wider than that of the meandering part 325b and furthermore, its width dimension continuously increases toward the inner side connecting part 322. In this embodiment, a width dimension of the outer connecting portion 329b also continuously increases toward the outer side connecting part 321 but the outer connecting portion 329b has a similar width dimension to the meandering part 325b.

The arm part 323d is connected with the inner side connecting part 322 through the inner connecting portion 324d and is connected with the outer side connecting part 321d through the outer connecting portion 329d. A structure of the meandering part 325d and the like are similar to those of the arm part 323b and thus their description is omitted.

In the plate spring 32 which is structured as described above, when a virtual quadrangle such as a square or a rectangle is drawn by which the outer side of the inner side connecting part 322 is surrounded, the arm parts 323a, 323b, 323c and 323d are disposed within areas corresponding to corner portions of the virtual quadrangle. Further, in the arm parts 323a and 323b, both of the meandering parts 325a and 325b are not formed on an outer side in the radial direction of the inner connecting portions 324a and 324b. On the contrary, both of the meandering parts 325a and 325b are formed over portions deviated from the outer side in the radial direction of the inner connecting portions 324a and 324b to one side in the circumferential direction (side in a clockwise CW direction in FIG. 6(A)). Also in the arm parts 323c and 323d, similarly to the arm parts 323a and 323b, both of the meandering parts 325c and 325d are not formed on an outer side in the radial direction of the inner connecting portions 324c and 324d but are formed over portions deviated from the outer side in the radial direction of the inner connecting portions 324c and 324d to one side in the circumferential direction (side in a clockwise CW direction in FIG. 6(A)). In addition, the inner connecting portions 324a, 324b, 324c and 324d are not disposed at an equal angular interval but, when the equal angular positions are set with the inner connecting portions 324a and 324c as the reference, the inner connecting portions 324b and 324d are disposed at positions deviated in the clockwise CW direction from the equal angular positions. Therefore, as shown by the two-dot chain line in FIG. 6(A), when a rectangle "P" whose oppositely faced long sides are contacted with the inner side connecting part is drawn as a virtual quadrangle, the arm parts 323a, 323b, 323c and 323d can be disposed within the rectangle "P". Therefore, in the back yoke 16 of the fixed body 2, the second plate spring 32 can be disposed in rectangular areas which are surrounded by the side face parts 161 and both end parts 163 of the side face part 162.

The structure of the first plate spring 31 is similar to that of the second plate spring 32 and thus its description is omitted. The first plate spring 31 and the second plate spring 32 are disposed so as to superpose each other in the optical axis direction "L".

As described above, in this embodiment, the plate springs 31 and 32 having roughly the same structure are used to movably support the movable lens body 3 in the optical axis direction "L". Therefore, when the second plate spring 32 is described as an example, the second plate spring 32 is provided with the four arm parts 323a through 323d between the outer side connecting parts 329a through 329d and the inner side connecting part 322. The arm parts 323a and 323b are respectively provided with the meandering parts 325a and 325b in which a plurality of radially extended straight line portions 326a and 326b are serially connected through the inner side turning portions 327a and 327b and the outer side turning portions 328a and 328b. Other arm parts 323c and 323d are similarly structured. Therefore, even when the areas around the movable lens body 3 where the arm parts 323a through 323d can occupy are small, a number of straight portions 326a and 326b can be disposed which is different from a case that many straight portions extending in the circumferential direction or the tangential direction are disposed so as to superpose toward the outer side in the radial direction. Accordingly, the numbers of the inner side turning portions 327a and 327b and the outer side turning portions 328a and 328b can be increased. Therefore, according to the structure as described above, vibration proofing and impact resistance are superior when the movable lens body 3 is moved in the direction perpendicular to the optical axis direction "L" or inclined in an oblique direction (tilt direction) with respect to the optical axis. Further, rigidity is provided which is enough to sufficiently withstand a stress that is applied when the movable lens body 3 is moved in the direction perpendicular to the optical axis direction "L" or inclined in an oblique direction (tilt direction) with respect to the optical axis. Therefore, the arm parts 323a through 323d can be securely prevented from plastically deforming.

Further, in the meandering parts 325a and 325b, the straight portions 326a and 326b are structured of eleven or twelve pieces of portions and thus, in both of the meandering parts 325a and 325b, more than five pieces of the straight portions 326a and 326b are juxtaposed in the circumferential direction. Therefore, even when the arm parts 323a through 323d are disposed within a small region, the meandering parts 325a and 325b can be formed which are provided with a number of the inner side turning portions 327a and 327b and a number of the outer side turning portions 328a and 328b. Accordingly, in accordance with this embodiment, stress can be sufficiently endured that is applied when the movable lens body 3 is moved in the direction perpendicular to the optical axis direction "L" or inclined in an oblique direction (tilt direction) with respect to the optical axis.

Further, the width dimension of the outer side turning portions 328a and 328b is wider than that of the inner side turning portions 327a and 327b. Further, the outer side turning portions 328a and 328b are curved with a larger radius of curvature than that of the inner side turning portions 327a and 327b. Therefore, even in a case that stress is concentrated on the outer side turning portion when the movable lens body 3 is moved in the direction perpendicular to the optical axis direction "L" or inclined in an oblique direction (tilt direction) with respect to the optical axis, damage of the outer side turning portions 328a and 328b can be prevented.

In addition, in the meandering parts 325a and 325b, a gap space having a sufficient space dimension is secured between the inner side turning portions 327a and 327b located on the center side in the circumferential direction and the inner side connecting part 322. Therefore, even when the movable lens body 3 is largely moved in the direction perpendicular to the optical axis direction "L" or inclined in an oblique direction (tilt direction) with respect to the optical axis, the inner side turning portions 327a and 327b do not contact with the inner side connecting part 322.

Further, the widths of the inner connecting portions 324a through 324d are formed to be wider and, in addition, formed continuously wider to the inner side connecting part 322. Therefore, even when a large load is applied to the inner connecting portions 324a through 324d, they are not damaged. Further, in the case that the inner connecting portions 324a through 324d are formed wider, stress is applied to the meandering parts 325a through 325d when the movable lens body 3 is moved in the direction perpendicular to the optical axis direction "L" or inclined in the oblique direction with respect to the optical axis. Therefore, stress can be efficiently absorbed when the movable lens body 3 is moved in the direction perpendicular to the optical axis direction "L" or inclined in the oblique direction with respect to the optical axis.

Further, the meandering parts 325a through 325d are formed in the areas deviated from the outer side in the radial direction of the inner connecting portions 324a through 324d to one side in the circumferential direction. Therefore, when a virtual quadrangle shape such as a square or a rectangle is drawn by which the outer side of the inner side connecting part 322 is surrounded, the arm parts 323a through 323d can be disposed at areas corresponding to the corner portions of the virtual rectangular shape. Moreover, in this embodiment, when a rectangular shape whose opposite long sides contact with the inner side connecting part 322 is drawn as a virtual quadrangle, the arm parts 323a through 323d are accommodated within the inner side of the virtual rectangle. Therefore, since the area which is occupied by the movable lens body 3 and the portions including the plate springs 31 and 32 can be made smaller, the entire size of the lens drive device 1 can be reduced.

In the embodiment described above, in the respective arm parts 323a and 323b, a plurality of the straight portions 326a and 326b is extended roughly in parallel to each other but the present invention is not limited to this embodiment. For example, in the meandering parts 325a and 325b, a structure may be adopted in which a plurality of straight portions 326a and 326b that are formed in a radial direction or a truncated chevron shape with the optical axis as a center are serially connected through the inner side turning portions 327a and 327b and the outer side turning portions 328a and 328b.

Further, in the embodiment described above, the inner side connecting part 322 is formed in a circular ring frame shape and the outer side connecting parts 321a through 321d respectively correspond to the tip end parts of the arm parts 323a through 323d. However, a structure may be adopted in which the entire or a part of the outer side connecting parts 321a through 321d are connected with each other.

In addition, in the embodiment described above, for example, in the four arm parts 323a through 323d of the second plate spring 32, the inner connecting portions of the arm parts at the opposite angular positions are extended on a straight line and two straight lines formed by the four inner connecting portions are intersected with each other at the center position of the inner side connecting part. However, the present invention is not limited to this embodiment. For example, a structure may be adopted in which two extended straight lines of opposite inner connecting portions of the plurality of the respective arm parts 323a through 323d are substantially parallel with each other on a side where the center position of the inner side connecting part is interposed or intersect at a position deviated from the center position of the inner side connecting part. According to the structure described above, the positions where the arm parts 323a through 323d apply elasticity to the movable lens body 3 are dispersed on a plane perpendicular to the optical axis direction "L" and the spring constant of the plate spring can be made constant and thus oscillation in a tilt direction of the movable lens body 3 can be suppressed effectively.

In the embodiment described above, four arm parts 323 are formed in the plate spring 32 but a plate spring having two arm parts 323 may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
a movable lens body which is provided with a lens;
a support body which movably supports the movable lens body through a plate spring in an optical axis direction; and
a magnetic drive mechanism for driving the movable lens body in the optical axis direction;
wherein the plate spring comprises:
an outer side connecting part which is connected with the support body;
an inner side connecting part which is connected with the movable lens body; and
a plurality of arm parts which is connected with the inner side connecting part through an inner connecting portion and the outer side connecting part through an outer connecting portion; and
wherein each of the plurality of arm parts comprises a meandering part;
wherein the meandering part comprises extending parts which are extended in a radial direction of the inner side connecting part and are serially connected with each other through inner side turning portions and outer side turning portions so that the extending parts are juxtaposed in the circumferential direction of the inner side connecting part.

2. The lens drive device according to claim 1, wherein the plurality of the extending parts of the meandering part which is extended in the radial direction comprises five or more extending parts which are juxtaposed in the circumferential direction.

3. The lens drive device according to claim 2, wherein the plurality of the extending parts of the meandering part which is extended in the radial direction comprises extending parts which are extended substantially parallel to each other.

4. The lens drive device according to claim 2, wherein a width dimension of the outer side turning portion is wider than a width dimension of the inner side turning portion.

5. The lens drive device according to claim 4, wherein the outer side turning portion curves with a larger radius of curvature than a radius of curvature of the inner side turning portion.

6. The lens drive device according to claim 5, wherein
the meandering part comprises three or more inner side turning portions in the circumferential direction, and
a gap space dimension between the inner side turning portion which is located on a center side of the meandering part in the circumferential direction and the inner side connecting part is wider than gap space dimensions between the inner side turning portions which are located on both end sides of the meandering part in the circumferential direction and the inner side connecting part.

7. The lens drive device according to claim 4, wherein a width dimension of the inner connecting portion is wider than a width dimension of the meandering part.

8. The lens drive device according to claim 2, wherein a radius of curvature of the outer side turning portion is larger than a radius of curvature of the inner side turning portion.

9. The lens drive device according to claim 2, wherein
the meandering part comprises three or more inner side turning portions in the circumferential direction, and
a gap space dimension between the inner side turning portion of the meandering part located on a center side in the circumferential direction and the inner side connecting part is larger than gap space dimensions between the inner side turning portions located on both end sides in the circumferential direction and the inner side connecting part.

10. The lens drive device according to claim 9, wherein a width dimension of the outer side turning portion is wider than a width dimension of the inner side turning portion.

11. The lens drive device according to claim 10, wherein a width dimension of the inner connecting portion is wider than a width dimension of the meandering part.

12. The lens drive device according to claim 2, wherein the meandering part is formed in an area which is deviated in the circumferential direction from an outer side position in a radial direction of a connection portion of the inner side connecting part with the arm part.

13. The lens drive device according to claim 12, wherein
the plate spring comprises a plurality of arm parts, and
respective meandering parts of the plurality of the arm parts are formed on a same direction side in the circumferential direction from the outer side position in the radial direction of the connection portion of the inner side connecting part with the arm part.

14. The lens drive device according to claim 12, wherein
the meandering part is formed in which the plurality of extending parts which is extended in the radial direction is serially connected through the inner side turning portions and the outer side turning portions, and
the outer side connecting part is disposed on a center side in the circumferential direction of the meandering part, and
an outer connecting portion which is connected with the outer side connecting part is formed on an opposite side to a connection portion of the inner side connecting part with the arm part with respect to the meandering part and is connected to the meandering part.

15. The lens drive device according to claim 2, wherein
the plate spring comprises a plurality of the arm parts, and
the inner connecting portions of the plurality of the arm parts which are connected with the inner side connecting part are formed so that two extended straight lines of the inner connecting portions are substantially parallel to each other in an area where a center position of the inner side connecting part is interposed by the two extended straight lines and, alternatively, intersect at a position deviated from the center position of the inner side connecting part.

16. The lens drive device according to claim 2, wherein the plate spring comprises a plurality of the arm parts and, when a virtual quadrangle of a square or a rectangle is drawn so as to surround the inner side connecting part, the meandering parts are disposed within areas corresponding to angular parts of the quadrangle.

17. The lens drive device according to claim 16, wherein when a rectangle as the virtual quadrangle is drawn whose oppositely arranged long sides are contacted with the inner side connecting part, the arm parts are disposed within an inner side of the rectangle.

18. The lens drive device according to claim 1, wherein
the plate spring comprises a plurality of the arm parts, and
the support body is provided with a rectangular shape when viewed from the optical axis direction of the lens, and
the arm parts are disposed within corner parts of the support body between the support body and the lens moving body.

* * * * *